United States Patent [19]

Huber

[11] Patent Number: 4,893,786

[45] Date of Patent: Jan. 16, 1990

[54] CABLE CONDUIT APPARATUS

[75] Inventor: Ernst Huber, Wettingen, Switzerland

[73] Assignee: GRETAG Aktiengesellschaft, Regensdorf, Switzerland

[21] Appl. No.: 279,299

[22] Filed: Nov. 30, 1988

Related U.S. Application Data

[63] Continuation of Ser. No. 89,125, Aug. 25, 1987, abandoned.

[30] Foreign Application Priority Data

Aug. 29, 1986 [CH] Switzerland ............... 3482/86

[51] Int. Cl.⁴ .................................................. B66D 1/50
[52] U.S. Cl. ................................................... 254/414
[58] Field of Search ............... 254/413, 414, 390, 900, 254/374, 387, 277, 386; 242/100.2

[56] References Cited

U.S. PATENT DOCUMENTS

| | | | |
|---|---|---|---|
| 998,385 | 7/1911 | Owen | 254/414 |
| 3,743,249 | 7/1973 | van Daalen | 254/900 X |
| 3,987,735 | 10/1976 | Lofink | 254/277 X |
| 4,157,812 | 6/1979 | Bennett | 254/414 X |
| 4,244,449 | 1/1981 | Renk | 254/414 X |
| 4,505,589 | 3/1985 | Ott | 356/402 |
| 4,552,339 | 11/1985 | Werners | 254/277 |

FOREIGN PATENT DOCUMENTS

| | | |
|---|---|---|
| 594305 | 9/1925 | France . |
| 828293 | 7/1981 | U.S.S.R. . |
| 714492 | 3/1952 | United Kingdom . |
| 2046693 | 11/1980 | United Kingdom . |
| 2092088 | 8/1982 | United Kingdom . |

Primary Examiner—Joseph J. Hail, III
Assistant Examiner—Katherine Matecki
Attorney, Agent, or Firm—Burns, Doane, Swecker & Mathis

[57] ABSTRACT

In a scanning densitometer the mobile head is connected by means of an optical fiber cable with stationary parts of the apparatus. The optical fiber cable is looped around a cable drum and guided by it. The cable drum is suspended by means of two supporting cord layouts looped around it in opposing directions in a rotating manner parallel to the linear path of motion of the measuring head. The supporting cord layouts are mounted stationarily on the apparatus and one of them contains an equalizing spring. This type of a cable conduit is highly protective and therefore particularly suitable for mechanically sensitive parts, such as for example, optical fiber cables.

10 Claims, 1 Drawing Sheet

CABLE CONDUIT APPARATUS

This application is a continuation of application Ser. No. 089,125, filed Aug. 25, 1987, now abandoned.

FIELD OF THE INVENTION

The invention relates generally to a conduit apparatus and more particularly to a cable which connects a stationary member with a member movable relative to said stationary member along a linear path.

BACKGROUND DESCRIPTION

Numerous, in particular automatic, measuring devices are provided with movable parts connected by means of a cable with stationary parts of an associated device. For example, in the case of a scanning densitometer the measuring head that may be moved linearly over a distance of for example 1.3 m, is connected electrically or optically by means of a optical fiber cable with a stationary electronic measuring apparatus. Many cables, in particular optical fiber cables, are mechanically sensitive in that they cannot tolerate kinking, have low bending rigidity and may be exposed to relatively weak tensile forces only. In addition, their sheathing is often not abrasion resistant so that in numerous cases sliding conduits must be avoided.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a conduit apparatus for a cable connecting a first member with a second member that is displaceable relative to the first member along a linear path. The apparatus includes a cable drum over which the cable is looped, at least partially, and two stationarily mounted supporting cord layouts from which the cable drum is rotatably suspended. The layouts extend essentially parallel to the linear path and are looped around the cable drum in opposing directions.

The foregoing and other aspects will become apparent from the following detailed description of the invention when considered in conjunction with the accompanying drawing figures. It is to be expressly understood, however, that the drawing is not intended as a definition of the invention but is for the purpose of illustration only.

DETAILED DESCRIPTION

Figure 1:
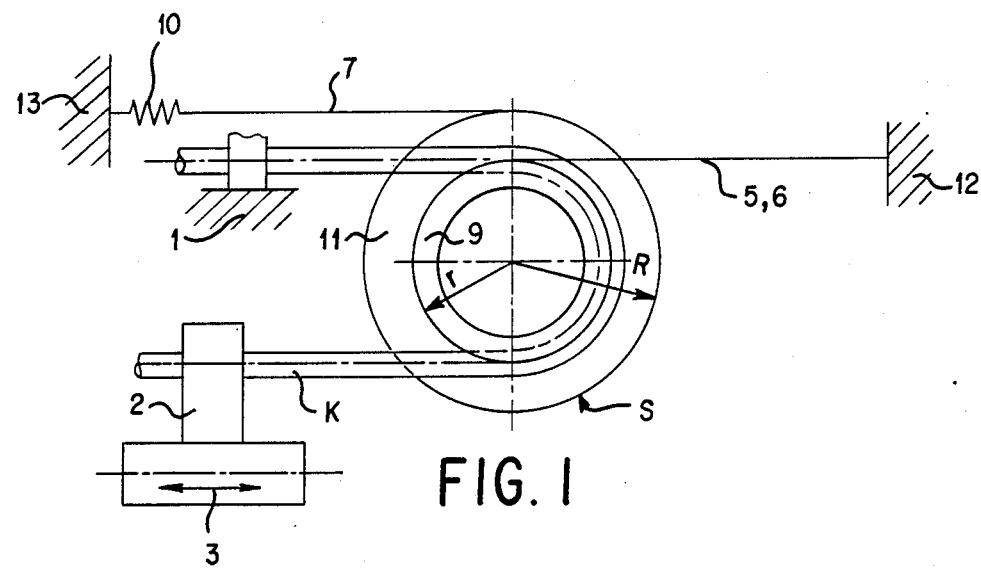
FIG. 1 is a schematic view illustrating an embodiment of the invention.
Figure 2:
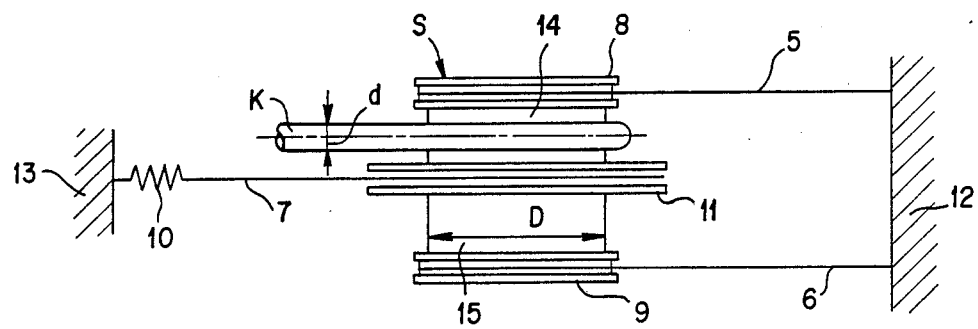
FIG. 2 is another schematic view illustrating an embodiment of the invention.

A cable is designated K in the Figures. It leads from a stationary part of the apparatus identified by the symbol 1 to a part 2 of the apparatus which may be moved back and forth relative to said part 1 along a linear path, with its mobility being indicated by the double arrow 3. In an application presented as an example of the device in a scanning densitometer, the cable may comprise an optical fiber cable connecting the mobile measuring head of the densitometer optically with the stationary electronic measuring apparatus.

The cable K is looped by 180° around a cable drum S, which is suspended in a "freely floating" manner by means of two supporting cord layouts 5, 6 and 7. One of the supporting cord layouts comprises two supporting cords 5 and 6, each of which is clamped tightly in a stationary manner at one end and has another end looped around pulleys 8 and 9 respectively, of the cable drum S and fastened thereto. The other supporting cord layout (in this case) contains only one supporting cord 7, which is fastened at one to a stationarily mounted equalizing spring 10 and has another end looped around a pulley 11 of the cable drum S, to which it is fastened. The directions of the loops of the supporting cords 5 and 6 and the supporting cord 7 oppose each other.

The three supporting cords 5, 6 and 7 are stressed, in part by means of the equalizing spring 10, strong enough between the stationary parts 12 and 13 of the apparatus, so that the cable drum S is being carried in a quasi-free floating manner without an appreciable sag.

The supporting cords 5, 6 and 7 are looped, as mentioned above, around the pulleys 8, 9 and 11, respectively. Between these pulleys, winding cylinders 14 and 15 are located; they form the cable drum S together with the pulleys. By means of the symmetrical layout of the pulleys 8 and 9 cooperating with the supporting cords 5 and 6 in relation to the pulley 11 cooperating with the supporting cord 7, the force components acting parallel to the axis of the cable drum S mutually compensate each other. The cable K which is to be guided, is looped around one of the winding cylinders 14 or 15.

The effective radii r of the two outer pulleys 8 and 9 are slightly smaller than the radius R of the center pulley 11. The diameter D of the winding cylinder 14 is smaller by the thickness of the cable K than the effective diameter 2r of the two outer pulleys 8 and 9.

If the end of the cable fastened to the movable part 2 of the apparatus is moved in FIG. 1 by a certain distance to the left, the cable drum S is displaced by rotation by one-half of the distance to the left, while the equalizing spring 10 is being stressed. The tensile force required for the displacement of the cable drum S is very small and may be adjusted by varying the radii of the pulleys within wide limits. If the end of the cable is moved to the right in the drawing, the cable drum S is also displaced to the right by the action of the stressed equalizing spring 10. Concerning the tensile forces acting in the cable, the condition is similar to that during a motion to the left.

The cable drum suspended in a "free floating" manner according to the invention thus possesses on the one hand a high supporting force, but on the other hand requires only an extremely low tensile force adjustable within wide limits, and is therefore ideally suited for the guidance of mechanically sensitive cables, in particular optical fiber cables.

The different looping diameters of the pulley provide a force reduction that may be adapted to the problem at hand. In actual practice the ratio of the difference $(2R-2r)$ of the two looping diameters $2R$ and $2r$ and the smaller looping diameter $2r$ amounts to approximately 0.1 to 0.02, preferably about 0.05 to 0.04. Obviously, different values are possible depending on the application.

The looping angle of the supporting cords 5 to 7 is naturally correlated with the maximum stroke length of the movable cable end or, respectively, the cable drum, in a manner such that independently of the position of the cable drum, no support cord is ever unwound completely.

The conduit device is obviously capable of conducting more than one cable simultaneously, wherein not all cables must necessarily be of the same type. For example, both optical fiber and electrical cables may be guided simultaneously.

As mentioned above, the conduit device according to the invention is particularly suitable for use in a scanning densitometer in which a measuring head displaced by a motor is optically connected by means of an optical fiber cable with an electronic measuring and evaluating device that is stationary relative to the apparatus. The device is obviously suitable for other applications also.

While this invention has been illustrated and described in accordance with a preferred embodiment, it is recognized that variations and changes may be made therein without departing from the invention as set forth in the claims.

What is claimed:

1. A conduit apparatus for a cable connecting a stationary first member with a second member that is displaceable relative to said first member along a linear path, comprising:
   a cable having a first end connected to said stationary first member and a second end connected to said displaceable second member;
   cable drum means for at least partially looping the cable thereover, said cable drum means having first and second diameters; and
   first and second stationarily mounted supporting cord layouts from which said cable drum means is rotatably suspended and which extend essentially parallel to the linear path and are looped around said cable drum means in directions opposing one another, said first and second cord layouts supporting said cable drum means between opposed stationary parts.

2. Apparatus according to claim 1, wherein the first supporting cord layout comprises an equalizing spring and a cord on said first diameter and the second supporting cord layout loops around the cable drum means on said second diameter.

3. Apparatus according to claim 2, wherein said second supporting cord layout comprises two cords which act on the cable drum symmetrically relative to the other supporting cord layout so that associated force components acting parallel to an axis of rotation of said cable drum means are mutually compensating.

4. Apparatus according to claim 3, wherein
   said first diameter has a radius R, said second diameter, being smaller than said first diameter, has a radius r, and the diameters have a ratio of difference $(2R-2r)$ to the diameter $2r$ of from about 0.1 to about 0.02.

5. Apparatus according to claim 4, wherein the cable drum means comprises a center and two outer pulleys together with two winding cylinders located respectively between the center pulley and one of the outer pulleys, wherein the diameters of the winding cylinders are smaller by the thickness of the cable looping around them, than the diameter of one of the two outer pulleys.

6. Apparatus according to claim 5, wherein the cable to be guided is an optical fiber cable.

7. Apparatus according to claim 6, wherein the cable is looped around the cable drum means over essentially one-half of the circumference of the latter.

8. Apparatus according to claim 7, wherein the second and first members, respectively, are a mobile measuring head and a stationary evaluating device of a scanning densitometer interconnected by the optical fiber cable.

9. A conduit apparatus for a cable connecting a stationary first member with a second member that is displaceable relative to said first member along a linear path, comprising:
   a cable having a first end connected to said stationary first member and a second end connected to said displaceable second member;
   cable drum means for at least partially looping the cable thereover, said cable drum means having first and second diameters; and
   first and second supporting cord layouts having first and second stationary mounts, respectively, said stationary mounts being located at opposite ends of said linear path for rotatably suspending said cable drum means from opposite ends of said linear path along directions which are essentially parallel to the linear path, said first and second supporting cord layouts being looped around said cable drum means in directions opposing one another.

10. A conduit apparatus comprising:
   a cable drum means for at least partially looping a cable thereover, said cable drum means being rotationally displaceable along a linear path and having first and second diameters;
   first and second supporting cord layouts stationarily mounted at opposite ends of said linear path, respectively, for rotatably suspending said cable drum means for linear displacement along said path, said first and second supporting cord layouts extending essentially parallel to said linear path and being looped around said cable drum means in opposing directions;
   wherein the first supporting cord layout comprises an equalizing spring and a cord looped around said first diameter, and the second supporting cord layout is looped around the cable drum means on said second diameter.

* * * * *